W. WRIGHT.
COMBINED TYPE WRITING AND COMPUTING MACHINE.
APPLICATION FILED JAN. 17, 1912.
1,264,874.
Patented Apr. 30, 1918.
3 SHEETS—SHEET 1.
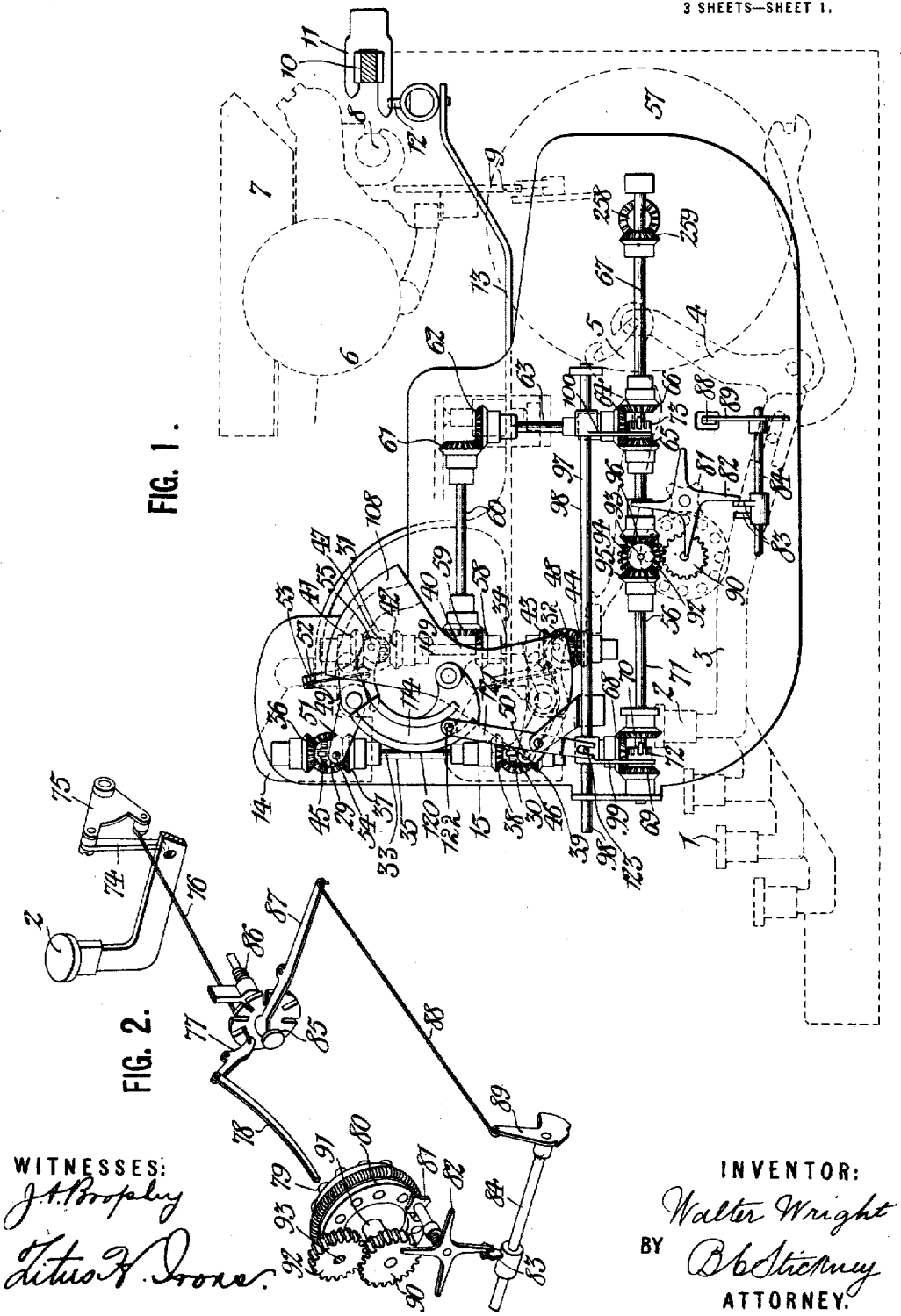

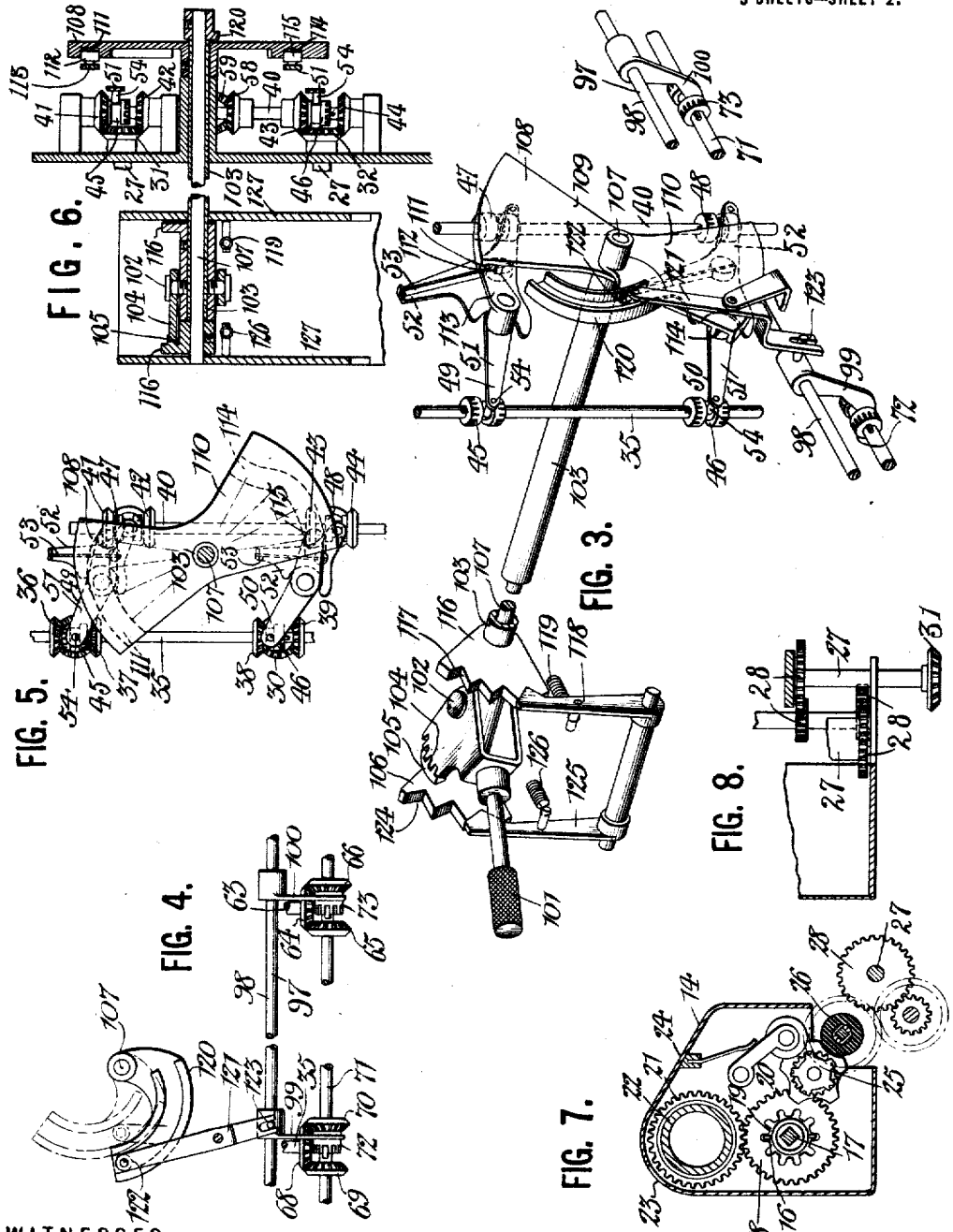

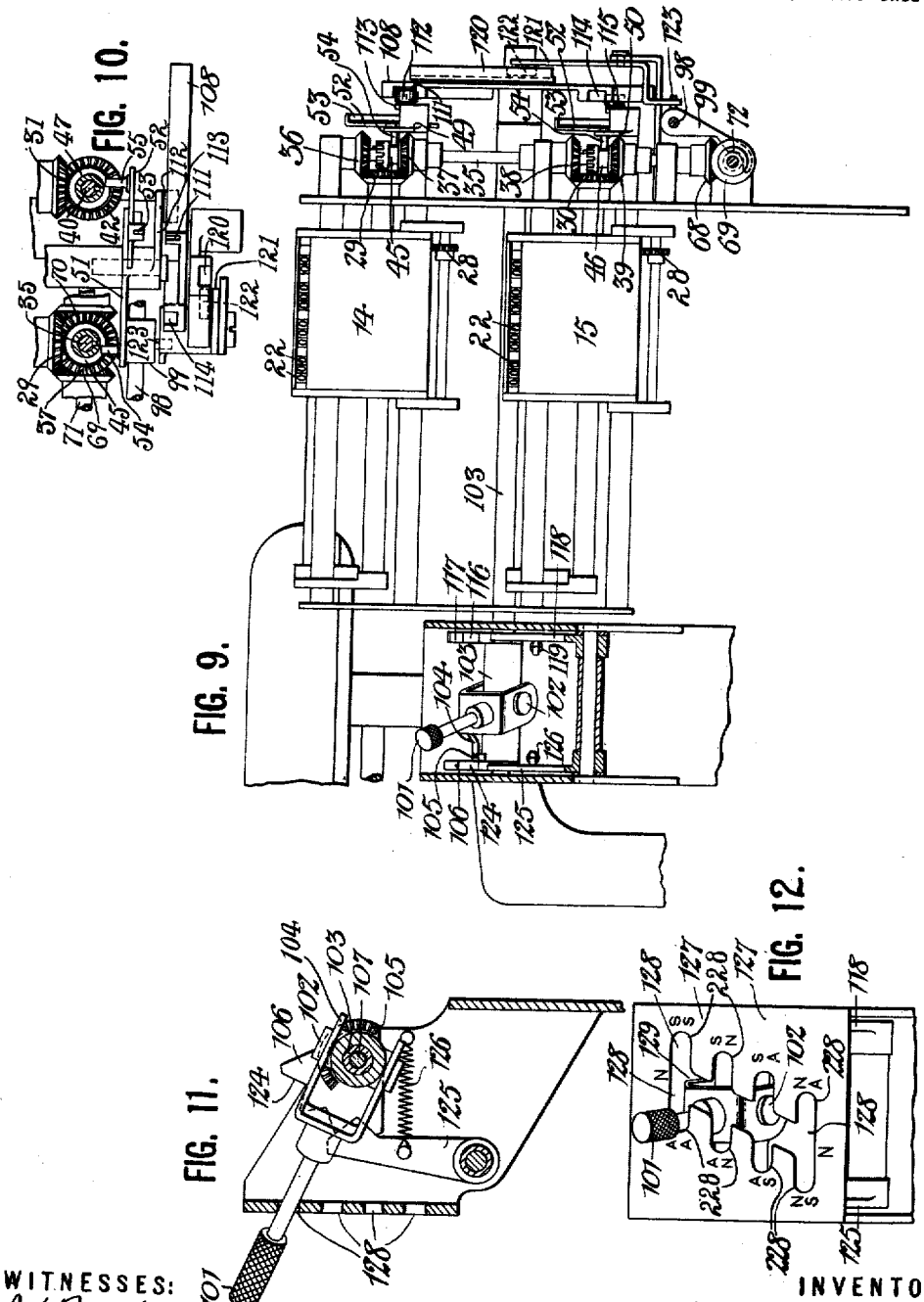

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,264,874.  Specification of Letters Patent.  Patented Apr. 30, 1918.

Application filed January 17, 1912. Serial No. 671,741.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to a semi-automatic selective control for computing machines applicable to many devices such as the Underwood-Wright combined typewriting and computing machines, and is an improvement on an application No. 543,603, filed February 12, 1910, by Gustave O. Degener and myself.

In said application the computing mechanism comprises a totalizer, a power-driven master wheel for turning the computing wheels in said totalizer *seriatim*, and a separately connected power-driven carry-over mechanism for the totalizer.

The connection from the drive to the master wheel and the carry-over mechanism is made through clutches which may be set so as to drive the master wheel in either direction, or to disconnect the master wheel from the power drive and the clutches. The clutches between the drive and the carry-over mechanism are so connected to the master wheel clutches that the reversal of one set of clutches reverses the other.

According to the present invention, there are provided a plurality of computing heads, which may be each provided with means for determining the activity and direction of the drive. One object of this invention is to enable an operator to rapidly set the various computing heads at any desired combinations of addition, subtraction, or being neutral by a simple manipulation of a single member. This may be done in a mechanism constructed according to the aforesaid application by providing each computing head with individual reversible clutches, controlled from said single member, and where said computing heads are all driven from the same source of power, a reversible clutch may be interposed in the main drive, also under control of said member. Then if said main drive clutch is reversed, the operation which has been going on in each computing head will be reversed; thus making the correction of errors extremely simple.

The controlling member may be in the form of a lever settable to different positions. Said lever may actuate a cam having a plurality of faces, the cam as a whole being universal to the individual clutches of all the computing heads, so that the mere shifting of the cam will set all the clutches in positions determined by the arrangement of the faces on said cam.

Said lever may also have a movement in a direction transverse to that which governs the cams, and this transverse movement may be carried to the clutch in the main drive, so as to enable said lever by said transverse movement to reverse or disconnect all connections simultaneously. Said lever preferably has associated with it a scale plate which limits its throw, and which is graduated to indicate what connections the lever effects at each of its effective positions.

Other features and advantages will hereinafter appear.

In the accompanying drawings,

Figure 1 is a side view in elevation with parts omitted for the sake of simplicity.

Fig. 2 is a skeleton perspective view, showing the connection of one of the numeral keys to the valuating mechanism for determining the extent of rotation of the master wheels.

Fig. 3 is a skeleton perspective view, showing the connection of the controller lever to the several cams for manipulating the individual controlling mechanisms and the main controlling mechanism.

Fig. 4 is a detail diagrammatic view, showing in full and dotted lines the opposite extremes of motion of the cam for manipulating the main controlling mechanism.

Fig. 5 is a diagrammatic view, indicating in dotted lines the several points on the cams corresponding to the several positions of the followers for the individual controlling mechanisms.

Fig. 6 is a vertical section taken along the concentric shafts which transmit the motion of the controller lever to the cams.

Fig. 7 is a detail vertical sectional view of one of the computing heads.

Fig. 8 is a detail horizontal section of the tens carrying gearing.

Fig. 9 is a fragmentary view in front elevation and partly in section.

Fig. 10 is a horizontal section taken above the cams for manipulating the individual and main controlling mechanisms.

Fig. 11 is a vertical section taken at the controlling lever.

Fig. 12 is a fragmentary front view in elevation showing the relation of the controller lever and the indicating plate which designates the several positions which the controller lever shall occupy in obtaining the combinations of states of the computing heads.

Referring more particularly to the separate parts of this invention as embodied in the form shown in the drawings, 1 indicates letter keys and 2 numeral keys, which are secured to key levers 3 and actuate, through the intermediary of rockers 4, type bars 5 to swing rearwardly against the front side of a platen 6 which is mounted on the carriage 7 of the usual Underwood type. This carriage 7 is mounted to run on one or more guides 8, and is permitted to move step-by-step in the usual manner by an escapement mechanism indicated in general by the numeral 9, and which is actuated at the depression of each of the keys, to permit a letter feeding movement of the carriage.

The carriage carries a rack 10, which may be provided with one or more tappets or stops 11 which intermittently engage a spring-pressed catch 12 on the rear end of a lever 13, so as to cause the front end of said lever to move step-by-step with said carriage, the traveling elements of a plurality of computing heads 14 and 15, as described in my application No. 574,813, filed August 1, 1910. In this instance, the traveling elements of the computing heads are shown to be the master wheels 16, one of which is indicated in Fig. 7. Inasmuch as the computing heads are the same, only one of them will be described.

The master wheel 16 (see Fig. 7) is driven by a motor in a manner hereinafter described and is mounted to slide on a master wheel shaft 17, which is shown to be squared so that the master wheel will rotate with the shaft, no matter what position it occupies longitudinally thereof. The master wheel 16 is moved from said lever 13 by means of a yoke 13ª connected to said master wheel so that it travels internally through a series of computing wheels 18, each one of which is provided with inwardly projecting teeth forming an internal gear 19 meshing with the master wheel 16 when it is in register therewith. These computing wheels 18 are also provided with external teeth forming external gears 20 which mesh with corresponding gears 21 carrying digit bearing dial wheels 22, so that the latter will be rotated to successively exhibit their numbers through an opening 23 in the computing head casing 24.

Once in each complete rotation of each of the computing wheels 18, and thus of each of the dial wheels 22, it is necessary to carry over from a lower denomination to a higher denomination. This object is attained in the manner described in said prior application No. 543,603, by a tens-carrying mechanism, indicated in general by the numeral 25. This tens carrying mechanism depends for its complete operation on the rotation and direction of rotation of a rubber roller 26, which is driven from a shaft 27 by a train of gearing indicated in general by the numeral 28. The master wheel shaft 17 for each of the computing heads is provided with a bevel gear, indicated in the case of the computing heads 14 and 15 by the numerals 29 and 30. Likewise, each of the shafts 27 of the tens carrying mechanism is provided with corresponding bevel gears 31 and 32.

For driving the master wheel bevel gears 29 and 30, there is provided gearing 33, and for driving the tens carrying bevel gears 31 and 32, there is provided gearing 34. The gearing 33 includes a shaft 35 on which are loosely mounted bevel gears 36 and 37 meshing with the bevel gear 29. Meshing with the bevel gear 30 on the shaft 35, there are also loosely mounted a pair of oppositely facing bevel gears 38 and 39, which are adapted to be clutched to said shaft 35 to drive the bevel gear 30 in opposite directions. Similarly, the gearing 34 includes a shaft 40 with corresponding pairs of loosely mounted gears thereon, meshing with the bevel gears 31 and 32. These gears are 41, 42, 43 and 44.

Interposed between each of the pairs of gears on the shafts 35 and 40, there are provided clutches 45, 46, 47 and 48, which are splined to their respective shafts, and shiftable to coöperate with either one of each pair, so as to determine the direction of rotation of the master wheel shafts 17 and the tens carrying shafts 27. These clutches are also capable of occupying an intermediate position in which they engage with neither gear of their respective pairs, and thus break the drive between the shafts 35 and 40 to the master wheels 16 and the tens carrying mechanisms 25.

To shift the two clutches controlling the master wheel and the tens carrying mechanism of each computing head, there are provided composite levers 49 and 50, each one of which comprises a main lever 51 and a supplementary lever 52 pivotally connected thereto, and having a limited play relative thereto, which is taken up by a spring 53. The main lever 51 in each instance has a pin 54 which fits in a circular groove in the clutch, so as to be capable of shifting the same without interfering with its rotation. Similarly the supplementary shifting lever 52 has a pin 55 which fits in a corresponding groove in the tens carrying clutch.

The gearings 33 and 34 are driven from a main gearing, indicated at 56, which in turn is driven by a motor 57 through the intermediary of a slip clutch not shown. To connect the gearing 34 to the gearing 56, the shaft 40 is provided with a bevel gear 58 which meshes with a bevel gear 59 on a shaft 60, so as to be driven, through the intermediary of meshing bevel gears 61 and 62, from a shaft 63. The shaft 63 is provided at its lower end with a bevel gear 64 meshing with a pair of bevel gears 65 and 66 loosely mounted on a shaft 67. Similarly the shaft 35 is provided with a bevel gear 68 which meshes with a pair of bevel gears 69 and 70 loosely mounted on a shaft 71 of the gearing 56. Either one of the pairs of gears 65 and 66 and 69 and 70 can be connected in driving relation with the gearing 56 by means of clutches 72 and 73, which are splined on the shafts 71 and 67, and are shiftable into engagement with either one of the pair of gears or to an intermediate position corresponding to the disconnection of both gears of each pair from the corresponding shafts, while the shafts 67 and 71, which form part of the main gearing 56, are driven from the motor 57. They are so driven only when a numeral key is actuated. Each of the numeral keys 2 is adapted to pull down on a link 74 when actuated, so as to rock a bell crank 75, which in turn pulls on a link 76 to swing a lever 77, whereby a jack 78 connected to said lever 77 will be plunged against one of a series of pins 79 on a valuating wheel 80 and will project said pin. There are a series of these jacks 78 corresponding to each of the numeral keys from "1" to "9," and they are each adapted to coöperate with a corresponding pin 79 on the valuating wheel 80.

One of the pins 79 which has been previously projected will be held by the torque of the revolving motor in engagement with an escapement wheel 81 which is held from rotation by an escapement wheel 82 fast to it and engaging one of a pair of detent lugs 83 on a rock shaft 84. The shaft 84 is rocked at the actuation of each of the numeral keys 2 by means of a collar 85, which is moved against the tension of a spring 86 by any one of the levers 77 which happens to have been actuated, so that the collar 85 in turn swings a lever 87 with which it is in engagement, so as to pull on a link 88 and thus rock the shaft 84 by means of an arm 89 which is secured to the shaft 84 and to the link 88.

The release of the valuating wheel 80 by the rotation of the escapement wheels 81 and 82 permits the valuating wheel 80 to rotate until the pin which has just been projected comes in engagement with the escapement wheel 81, when the valuating wheel 80 will once more be arrested. The valuating wheel 80 thus permits the motor 57 to rotate the shafts 71 and 67 to an extent determined by the pin projected, and therefore by the numeral key depressed. The connections to the motor include a gear 90 fast on the shaft 91 of the valuating wheel meshing with a gear 92 on a shaft 93, which is also provided with a bevel gear 94 meshing with bevel gears 95 and 96 secured to the shafts 71 and 67. The shaft 67 is driven from the motor through the clutch not shown and through the intermeshing bevel gears 258 and 259.

To shift the clutches 72 and 73 so as to determine whether the gearings 33 and 34 shall be rotated by the main gearing 56 and also to determine the direction of rotation, there is provided a shifter 97 which is shown in the form of a rod 98 slidingly mounted in suitable bearings and having arms 99 and 100 engaging respectively in circular grooves provided in the clutches 72 and 73.

It has been pointed out that the composite levers 49, together with the clutches, form individual controlling mechanism for determining the rotation and direction of rotation of each computing head at the computing head. It will also be seen that the shifter 97, together with the clutches manipulated thereby, forms a main controlling mechanism which will determine the rotation and direction of rotation of the gearings to the master wheels and tens carrying mechanisms of all of the computing heads. It will therefore be evident that the state of the computing heads can be controlled by their individual controlling mechanisms and by the main controlling mechanism.

In this invention a combination of movements of the individual controlling mechanisms and the main controlling mechanism is utilized to obtain all possible combinations of states of all of the computing heads. For this purpose there is provided a controller 101 shown in the form of a lever pivotally mounted at 102 on a tubular shaft 103 both so as to swing transversely relative to said shaft, and also so as to rotate said shaft when moved vertically. This controller is provided with a segmental gear 104 meshing with a corresponding gear 105 on an arm 106 which is secured to a shaft 107 extending through the tubular shaft 108 and concentric therewith. It will thus be seen that if the controller 101 is swung vertically it will rotate with the shaft 103. It will also be seen that if the controller 101 is swung transversely, that is to say horizontally, it will rotate the shaft 107. By a combined vertical and horizontal movement of the controller 101, a combination of rotations of the shafts 103 and 107 can be obtained.

The shaft 103, by its movements, controls the manipulation of the individual controlling mechanisms for the separate computing heads. For this purpose it is provided at its farther end with a multiple cam 108, shown in the form of a pair of segments or arms 109 and 110 extending from opposite sides of the shaft 103 to which it is secured. The arm 109 is provided with a cam groove 111 in which extends a follower 112 of the controlling mechanism for the computing head 14. This follower 112 is secured to an arm 113 of the composite lever 49, so as to actuate the same to shift the clutches of the computing head 14. The connection of the follower 112 and the cam groove 111 is shown to be positive, so that a movement of the composite lever 49 in either direction will be positively obtained. The arm 110 is likewise provided with a cam groove 114 which is similarly engaged by a follower 115 forming an arm of the composite lever 46 for shifting the clutches of the computing head 15. By reference to Fig. 5, the form of the cam grooves 111 and 114 will be seen. In the position of the cam in Fig. 5, the controller 101 has been swung downwardly to the extreme limit of its throw, so that the follower 112 of the upper computing head 114 is in the depressed portion of the cam groove 111 corresponding to a neutral position of the clutches 45 and 47. The remainder of the cam groove 111, after the point of shifting from the neutral portion thereof, corresponds to an adding position of the clutches 45 and 47. That is to say, the cam groove 111 which is moved by the controller 101 to any one of four positions indicated by the dotted lines in Fig. 5 will only shift the clutches 45 and 47 to two positions corresponding to adding and neutral. In other words, for three positions of the composite cam 108, the clutches 45 and 47 will be in the position corresponding to adding, with a normal rotation of the gearings 33 and 34; in the fourth position, the clutches will be in an intermediate or neutral position.

The cam groove 114 on the other hand, rotating from right to left of Fig. 5, will position the follower 115 so as to cause the clutches 46 and 48 to occupy the positions corresponding to adding, neutral, subtracting and subtracting. To hold the cam 109, and thus the shaft 103, in any one of its four positions of adjustment, there is provided a segment ratchet 116 secured to the shaft 103 and having four sockets 117 to be engaged by a latch 118, which is yieldingly held in engagement therewith by a spring 119 which will permit the shaft and cam to rotate when forcibly moved by the controller 101.

The shaft 107, which extends through and beyond the shaft 103, is provided on its far end with a cam 120 which sets the shifter 97 to any one of its three positions through the intermediary of a lever 121 which has a follower 122 engaging the cam 120, and which also has a pin-and-slot connection 123 with the shifter 97. The two extreme positions of the cam 120 are shown in Fig. 4, and correspond in the full line position to a rotation in one direction and in the dotted line position to a rotation in the opposite direction. The cam 120 is capable of occupying an intermediate position in which the gearings 33 and 34 are silenced by disconnecting all of the gears 69, 70, 65 and 66 from driving relation with the gearing 56. To latch the shaft 107, and thus the cam 120, in any one of its three positions of adjustment, the arm 106 is also provided with teeth forming a segment ratchet, which teeth form between them three sockets 124 into which a detent latch 125 can catch and be yieldingly held by a spring 126.

By referring to Fig. 12, the numerous positions which the controller 101 can occupy in order to obtain the several combinations of states of the computing heads will be seen. These positions may be designated by an indicating plate 127, which is provided with pockets 228 formed at the extremity of horizontal slots 128 so as to determine the limits of movement of the controller and also determine the positions of the controller for the several combinations.

At each of these pockets 228, the indicating plate is provided with letters indicating the states under which the computing heads will act when the controller lever is in that particular pocket, the upper letters indicating the upper computing head and the lower letters the lower computing head. It will be noted that all of the horizontal slots are connected by a cross slot 129 which admits of the controller 101 being shifted from one slot to the other. It will be further noted that this slot 129 is inclined downwardly from right to left, to allow for a vertical movement of the controller 101 in rotating the shaft 103 without rotating the shaft 107, through the intermediary of the meshing segments 104 and 105. This is also allowed for by placing the lower pockets in a position offset to the left from the upper pockets.

In the operation of the device if any combination of states of the plurality of computing heads is desired, it is merely necessary to refer to the indicating plate 127 on which every combination of states of which the computing heads are capable is indicated. In the position of the controller lever 101 in Fig. 12, both of the computing heads will be in their adding state. This corresponds to the position of the parts in the skeleton figure shown in Fig. 3, wherein it will be seen that the cam follower 112 is in the extreme left hand portion of the cam groove 111, and the follower 115 is in the extreme right hand portion of the cam groove 114. The follower 122 for the controlling mechanism to the main drive will be found in the lowermost portion of the cam groove 120. In this position the clutches 45 to 48 will all be down, so that the master wheels and tens carrying gears will cause the numbers represented by the numeral keys 2 struck to be added. The clutches 72 and 73, moreover, will be in the position indicated in Fig. 1, enabling this action to be carried on without interference from the main controlling mechanism.

If it should be desired to throw out all of the computing heads, that is, to silence them, it would be merely necessary to throw the controller 101 to an intermediate position between the extremities of any of the slots 128, that is to say, in any position in the slot 129. This will cause a shifting of the arm 106 downwardly, so that the latch 125 will slip into the middle notch 124 and hold the cam 120 in a position midway between the two positions shown in Fig. 4, which will correspond to a position of the clutches 72 and 73 midway between the pairs of gears 69 and 70 and 65 and 66, whereby the gearings 33 and 34 will be operatively disconnected from the motor 57. Even if some of the numeral keys should be struck at this time, there would be no computation, and such an arrangement can be used in writing dates or any other matter in which numerals are used, which should not be computed.

If, for the purpose of correction or in an ordinary computing operation, it is desired that both of the computing heads should be subtracting, the lever would be shifted to a position in the extreme right of the uppermost slot 128. If this shifting was from the position shown in Fig. 12, the shaft 103 would remain stationary without actuation, and the shaft 107 would have been rotated from the position shown in Fig. 3 to the opposite extreme of its throw corresponding to the position of the cam 120, shown in full lines in Fig. 4.

It will be seen by still referring to Fig. 4 that the clutches 72 and 73 would be shifted to the opposite extreme of their throw from the position shown in Fig. 1 so that both of the gearings 33 and 34, and thus both of the computing heads 14 and 15, would have the movable parts thereof rotated in a direction opposite to the direction in which they would rotate in Fig. 1, so that both of the computing heads would subtract numerals struck on the numeral keys 2 from such numbers as have already been accumulated on the computing heads.

Similarly any other combination of the computing heads can be obtained by merely shifting the controller lever 101 to the extremities of the slots 128, according to the particular combination desired. Such movements of the controller lever 101 are resolved by the cam 108 and the segment 104 into horizontal and vertical components, the horizontal movement shifting the cam 120 which positions the clutches 72 and 73 of the main controlling mechanism, and the vertical movement of the controller lever 101 rotating the shaft 103, and thus the cam 108, thereby setting the individual controlling mechanisms for the separate computing head. The cams, and also the controller lever, are locked by the latches 118 and 125, in any of the several positions of adjustment, but in a yielding manner, so that a forcible movement of the controller lever will be possible, to obtain a new combination of states of the computing heads.

Certain features disclosed herein are broadly claimed in my co-pending application, Serial No. 569,502, filed June 29, 1910, which application is directed, among other things, to the feature of the provision of a series of state-controlling cams or the like upon a revoluble controller, and also to the feature of shifting said controller to silence the same, and of bringing into use other controllers for individually determining the state of the totalizers. The claims in this application are restricted to features not disclosed in said application No. 569,502.

Variations may be resorted to within the scope of the invention, and portions of the improvements may be used without others.

Having thus described my invention, I claim:

1. The combination with a plurality of computing heads, of individual controlling mechanisms for governing the state of each head, a main controlling mechanism for governing the state of all of the heads, and a controller for governing the action of all of said controlling mechanisms.

2. The combination with a plurality of computing heads, of individual controlling mechanisms for governing the state of each head, a main controlling mechanism for governing the state of all of the heads, a cam for controlling said individual controlling mechanisms, a cam for controlling said main controlling mechanism, and a controller for manipulating said cams.

3. The combination with a plurality of computing heads, of individual controlling mechanisms for governing the state of each head, a main controlling mechanism for governing the state of all of the heads, a cam for controlling said individual controlling mechanisms, a cam for controlling said main controlling mechanism, and a controller for manipulating said cams, the movement of said controller in one direction actuating one of said cams, and the movement of said controller in another direction actuating the other of said cams.

4. The combination with a plurality of computing heads, of individual controlling mechanisms for governing the state of each head, a main controlling mechanism for governing the state of all of the heads, and single means for manipulating one of said individual controlling mechanisms and said main controlling mechanism.

5. The combination with a plurality of computing heads capable of existing under a plurality of states of activity as to the character of computation carried on thereby, of a single controller for selectively obtaining any desired combination of states of all of said computing heads.

6. The combination with a plurality of computing heads capable of existing under a plurality of states of activity as to the character of computation carried on thereby, of a single controller for selectively obtaining any desired combination of states of all of said computing heads, the position of said controller determining the particular combination of states under which said computing heads exist at any particular instant.

7. The combination with a plurality of computing heads, of individual controlling mechanisms for governing the state of each head, a main controlling mechanism for governing the state of all of the heads, and a controller for governing the action of all of said controlling mechanisms, the movement of said controller in one direction governing the action of certain of said controlling mechanisms, and the movement of said controller in another direction governing the action of certain other of said controlling mechanisms.

8. The combination with a plurality of computing heads, each having a master wheel and tens carrying mechanism, of gearing for driving said master wheels, gearing for driving said tens carrying mechanisms, individual controlling mechanisms for each computing head governing the drive and direction of drive of the master wheel and tens carrying mechanism of each head, gearing for driving said first and second mentioned gearings, main controlling mechanism for said last mentioned gearing, and a single controller for manipulating all of said controlling mechanisms.

9. The combination with a computing head, of actuating means therefor, connections between said actuating means and said computing head variable at two points for controlling the state of said computing head, and a single means for controlling the state of said head by varying said connections at both said points.

10. The combination with a computing head, of a rotatable master wheel therefor, means for actuating said master wheel, gearing connecting said actuating means and said master wheel reversible at two points for controlling the direction of rotation of said master wheel, to thereby determine the state of said computing head, and a single means for shifting said gearing at both of said points.

11. The combination with a computing head embodying a rotatable master wheel, of means for actuating said master wheel, gearing connecting said means with said master wheel including a reversing mechanism for controlling the rotation of said master wheel, a reversing mechanism located intermediate said first-mentioned reversing mechanism and said actuating means, and single means for shifting both of said reversing mechanisms either in the same or opposite senses.

12. The combination with a plurality of computing heads, each having a master wheel, of gearing for driving said master wheels including mechanism for governing the rotation and direction of rotation of each of said master wheels, mechanism for governing the direction of rotation of said gearing, and means for governing both of said mechanisms from a single point.

13. The combination with a plurality of computing heads, each having a master wheel and tens carrying mechanism, of individual controlling mechanism for each computing head to govern the rotation and direction of rotation of said master wheels and said tens carrying mechanisms, a main controlling mechanism for all of said computing heads to govern the rotation and direction of rotation thereof, and a single controller for governing the states of all of said computing heads by a combination of movements of all of said controlling mechanisms.

14. The combination with a plurality of computing heads, of individual controlling mechanism for governing the state of each computing head, a main controlling mechanism capable of controlling the state of all of said computing heads, a cam for operating said main controlling mechanism, cam means for operating each of said individual controlling mechanisms, and a controller movable in one direction to operate said cam and in another direction to operate said cam means.

15. In a computing machine, the combination with computing mechanism including a plurality of computing heads, each capable of existing under different states, as to addition, subtraction or neutral, of a state-determining cam member to determine different states of said computing heads, said cam member having a cam part for determining the addition or neutral state of one of said heads, and a cam part for determining the addition, subtraction or neutral state of another of said heads, and means acting jointly with said cam member for determining all possible combinations of states of said computing heads.

16. The combination with a plurality of computing heads, of individual controlling mechanisms for governing the state of each computing head, a multiple cam for operating all of said individual controlling mechanisms, a main controlling mechanism capable of governing the state of all of said computing heads, a cam for shifting said main controlling mechanism, a shaft connected to said last-mentioned cam, a shaft connected to said multiple cam, and a single lever for rotating both of said shafts.

17. The combination with a plurality of computing heads, of individual controlling mechanisms for governing the state of each of said computing heads, a multiple cam for actuating said individual controlling mechanisms, a main controlling mechanism capable of governing the state of all of said computing heads, a cam for actuating said main controlling mechanism, concentric shafts secured to said cams, and a single lever connected to all of said shafts to manipulate all of said cams.

18. In a computing machine, the combination with computing mechanism, including a plurality of computing heads, of driving mechanism therefor, connections between said driving mechanism and said computing heads, means for individually varying said connections at each computing head, common means for varying said connections, and two cam members, one acting on said individual connections and the other acting on said common means to thereby control said computing heads as to all possible combinations of states thereof.

19. The combination with a plurality of computing heads, of individual controlling mechanisms for governing the state of each computing head, a main controlling mechanism capable of governing the state of all of said computing heads, a multiple cam for manipulating said individual controlling mechanisms, a cam for manipulating said main controlling mechanism, concentric shafts connected to said cam, a lever pivotally mounted on one of said shafts, and a driving connection between said lever and the other of said shafts.

20. The combination with a plurality of computing heads, of individual controlling mechanisms for governing the state of each computing head, a main controlling mechanism capable of governing the state of all of said computing heads, a multiple cam for manipulating said individual controlling mechanisms, a cam for manipulating said main controlling mechanism, a lever for controlling both of said cams and shiftable in one direction to control one cam and in a transverse direction to control the other of said cams, a segment movable with each of said cams, and a spring-pressed latch engaging each of said segments to hold said cams in their several positions of adjustment, and to position said lever.

21. The combination with a computing head having a master wheel and tens carrying mechanism, of a clutch shiftable to control the rotation and direction of rotation of said master wheel, a clutch shiftable to control the rotation and direction of rotation of said tens carrying mechanism, a composite lever for concomitantly shifting said clutches, an arm connected to said composite lever, a follower connected to said arm, a cam engaging said follower to shift said composite lever, and means for actuating said cam.

22. The combination with a plurality of computing heads, of individual controlling mechanisms for governing the state of each of said computing heads, a multiple cam having a cam groove for engagement with each of said controlling mechanisms to shift the same, said cam grooves being formed to shift said controlling mechanisms to any one of a plurality of positions corresponding to adding, subtracting and neutral of said computing heads, and means for manipulating said cam to select certain combinations of states of said computing heads.

23. The combination with a plurality of computing heads having certain rotatable parts, of means for rotating said parts, individual means for controlling the rotation and direction of rotation of said parts, and main means common to all of said computing heads for controlling the rotation and direction of rotation of said parts, cam means for manipulating said individual means, a cam for manipulating said main means, and a universally movable controller for manipulating said cam means and said cam to selectively control any combination of states of said computing heads.

24. In a computing machine, the combination with computing mechanism including a plurality of computing heads, each capable of existing under different states, as to addition, subtraction, or neutral, of a state-determining cam member having a cam part for determining the addition or neutral state of one head and a cam part for determining the addition, subtraction or neutral state of another head, and another cam member acting conjointly with the first cam member, said second cam member operating to reverse, neutralize or make no change in the states of the computing heads as determined by the first cam member, whereby all possible combinations of states of both said heads may be determined.

25. The combination with a plurality of computing heads, of two sets of gearing for driving certain parts of all of said computing heads, a source of power, gearing for connecting said first-mentioned gearings to said source of power, including a clutch mechanism for each of said first-mentioned gearings, to govern the rotation and direction of rotation of each of said first-mentioned gearings, a shifter for concomitantly manipulating all of said clutching mechanisms, a cam for actuating said shifter, a clutch on each of said first-mentioned gearings for each of said computing heads to govern the rotation and direction of rotation of certain parts of said computing heads, controlling mechanisms for said last-mentioned clutches, cam means for manipulating said controlling mechanisms, concentric shafts connected to said cam and said cam means, a lever pivotally mounted on one of said shafts, and operative connections between said lever and the other of said shafts.

26. The combination with a computing head, of controlling mechanism for governing the state of said computing head, a cam for actuating said controlling mechanism, a shaft connected to said cam, an arm on said shaft, a segment gear on said arm, and a lever for manipulating said shaft having a segment gear engaging said first-mentioned segment gear.

27. The combination with a plurality of computing heads, of individual mechanisms for governing the state of each computing head, a multiple cam for manipulating said mechanisms, a main mechanism for governing the state of all of said computing heads, a cam for manipulating said main mechanism, concentric shafts connected to said cam, a lever pivotally mounted on one of said shafts, an arm on the other of said shafts, a segment gear on said arm, a segment on said lever engaging said first-mentioned segment gear, whereby a composite movement of said lever will rotate both of said shafts.

28. The combination with a plurality of computing heads, each capable of existing under a plurality of states of adding, subtracting and neutral, of a controller having a plurality of vertically and horizontally distinct positions corresponding to the several combinations of states of which the plurality of computing heads are capable, and governing mechanism actuated by said controller and controlling the combinations of states of said computing heads.

29. The combination with a plurality of computing heads, each capable of existing under a plurality of states of adding, subtracting and neutral, of a controller having a plurality of vertically and horizontally distinct positions corresponding to the several combinations of states of which the plurality of computing heads are capable, governing mechanism actuated by said controller and controlling the combinations of states of said computing heads, and means for determining the several positions of said controller.

30. The combination with a plurality of computing heads, each capable of existing under a plurality of states of adding, subtracting and neutral, of a controller having a plurality of vertically and horizontally distinct positions corresponding to the several combinations of states of which the plurality of computing heads are capable, governing mechanism actuated by said controller and controlling the combinations of states of said computing heads, and indicating means for designating the combinations of states under which said computing heads exist corresponding to the several positions of said controller.

31. The combination with a plurality of computing heads, of means for selectively controlling the combinations of states under which said computing heads may exist at a plurality of points, certain individual to each computing head and certain common to all the computing heads, and a controller for actuating said means.

32. In a typewriting machine, the combination with a plurality of gangs of computing wheels and a key-controlled device for determining how far each computing wheel shall be turned, of a clutch for each gang intermediate said key-controlled device and its gang, of a single clutch between all said first clutches and said key-controlled device, and a single controller for individually setting all of said clutches.

33. In a combined typewriting and computing machine, the combination with a plurality of controlling devices, of a single controller movable in two directions for setting said controlling devices, and means for automatically positioning said controller in the different positions it may assume in each direction of its movement.

34. The combination with a plurality of computing heads capable of existing under a plurality of states as to the character of computing action thereof, of controlling mechanisms, one individual to each of said heads, a controlling mechanism common to all of said heads, actuating mechanism for said controlling mechanisms, and a single member for operating said actuating mechanism, so as to produce a combinative effect in selecting different combinations of states of the several computing heads by a joint action of said individual controlling mechanisms with said common controlling mechanism.

35. The combination with a plurality of computing heads, of controlling mechanisms individual to each of said computing heads, a main controlling mechanism for all of said heads, and means acting in moving from one point to another, to operate one of said individual controlling mechanisms and said main controlling mechanism, so as to produce a combinative change in the states of said computing heads.

36. The combination with a plurality of computing heads, of controlling mechanisms, one individual to each of said computing heads, actuating means common to all of said controlling mechanisms, a main controlling mechanism for governing the states of all of said computing heads, actuating means for said main controlling mechanism, and a single operating means common to all of said actuating means.

37. The combination with a plurality of computing heads, of controlling mechanisms, one individual to each of said computing heads, actuating means common to all of said controlling mechanisms, a main controlling mechanism for governing the states of all of said computing heads, an actuating means for said main controlling mechanism, and a single operating means common to all of said actuating means, said operating means having a member moving in one plane to effect a manipulation of one of said actuating means, and moving in another plane to effect a manipulation of another of said actuating means, said planes being at an angle to each other, so that a combinative movement of said member will effect a manipulation of all of said actuating means.

38. The combination with a plurality of computing heads, of individual controlling mechanisms for governing the states of said heads, a main controlling mechanism common to all of said heads, and a master controlling mechanism for operating said individual controlling mechanisms and said main controlling mechanism.

39. The combination with a computing head, of a train of gearing for driving said head, a controlling mechanism for determining the character of drive of said computing head at said head, a controlling mechanism for governing the character of drive of said computing head at a point remote from said head, and a unified controller for operating both of said controlling mechanisms from a common point.

40. In a computing machine, the combination with a reversing mechanism, of a sleeve, a ratchet on said sleeve, a cam plate on said sleeve controlling said mechanism, a second reversing mechanism, a shaft extending through said sleeve, a ratchet plate beyond said first-named ratchet fast to said shaft, a cam at the opposite end of said shaft beyond said first-named cam plate controlling said second mechanism, and a single handle controlling said shaft and said sleeve.

41. The combination with a pair of computing heads, of a controlling mechanism individual to each of said computing heads, a cam for shifting one of said controlling mechanisms, having four positions, a second cam for the other of said controlling mechanisms arranged for four positions, said cams being joined so as to move in unison, and a single handle for said cams, so that the combined states of said computing heads will be under the control of said handle.

42. The combination with a pair of computing heads, of a controlling mechanism individual to each of said computing heads, a cam for shifting one of said controlling mechanisms, having four positions, a second cam for the other of said controlling mechanisms arranged for four positions, said cams being joined so as to move in unison, a single handle for said cams, so that the combined states of said computing heads will be under the control of said handle, a reversible driving mechanism for both said computing heads, and means operated by said handle for reversing said driving mechanism so as to give just the opposite states to said computing heads in case they are in an active state as determined by said cams.

43. The combination with a pair of computing heads, of a controlling mechanism individual to each of said computing heads, a cam for shifting one of said controlling mechanisms, having four positions, a second cam for the other of said controlling mechanisms, arranged for four positions, said cams being joined so as to move in unison, a reversible driving mechanism for both said computing heads, means for reversing said driving mechanism so as to give just the opposite states to said computing heads in case they are in an active state as determined by said cams, and a single member for operating both said cams and said last-mentioned means so as to determine any combination of states of which said computing heads are capable.

44. In a computing machine, the combination with computing mechanism, of a member adapted to move in two planes, and connections from said member to control different combinations of states of said computing mechanism, according to the different positions said member may occupy in said two planes.

45. In a computing machine, the combination with computing mechanism, of a handle adapted to move in various planes, two kinds of controlling mechanism for said computing mechanism, a shaft for one kind of controlling mechanism, a sleeve on said shaft for another kind of controlling mechanism, and connections whereby said handle's motion in various planes is resolved into motion of said sleeve and said shaft.

46. In a computing machine, the combination with two totalizers, and a controlling device for each, of a rotatable shaft, a single cam plate fast on said shaft, a follower for each controlling device coöperating with said cam plate, and cams on said plate arranged to operate the followers to cause said followers to produce combinations of states of action of said totalizers.

47. In a computing machine, the combination with two totalizers, and a controlling device for each, of a rotatable shaft, a single cam plate fast on said shaft, a follower for each controlling device coöperating with said cam plate, cams on said plate arranged to operate the followers to cause said followers to produce combinations of states of action of said totalizers, a second cam plate, a third controlling device, and a follower coöperating with said second cam plate for determining how said controlling devices shall be effective.

48. In a computing machine, the combination with two totalizers, and a controlling device for each, of a rotatable shaft, a single cam plate fast on said shaft, a follower for each controlling device coöperating with said cam plate, cams on said plate arranged to operate the followers to cause said followers to produce combinations of states of action of said totalizers, a second cam plate, a third controlling device, a follower coöperating with said second cam plate for determining how said controlling devices shall be effective, a sleeve on said shaft for the other of said cam plates, and a single handle adapted to selectively operate said cam plates in combination.

49. In a computing machine, the combination with computing mechanism, of a handle, a sleeve on which it is pivotally mounted, a shaft within said sleeve, a gear on said shaft, a gear on said handle adapted to rotate said shaft independently of said sleeve, and controlling devices for said computing mechanism operated by said shaft and sleeve.

50. In a computing machine, the combination with a totalizer adapted to add or subtract, of two devices for determining whether said totalizer shall add or subtract, and a single handle for controlling said devices independently of one another to determine different states of said totalizer.

51. In a combined typewriting and computing machine, the combination with a traveling carriage, of a plurality of totalizers adapted to add or subtract in different columns or zones as determined by the position of said carriage, a device associated with each totalizer for determining whether it shall add or subtract, a single device for determining whether both said totalizers shall add or subtract, and a single handle controlling all of said devices.

52. In a combined typewriting and computing machine, the combination with a plurality of totalizers, of a device associated with each totalizer for determining whether it shall add or subtract, a single device for determining whether both said totalizers shall add or subtract, a single handle controlling all said devices, a shaft operated by said handle for controlling one of said devices, and a sleeve on said shaft also operated by said handle for controlling another of said devices.

53. In a combined typewriting and computing machine, the combination with a plurality of totalizers, of a controlling device for each of said totalizers, a single handle for controlling both of said totalizers, a single cam plate operated by said handle for operating said controlling devices, and a follower for each controlling device adapted to be moved by said cam plate so that said cam plate, by mere movement thereof by said handle, will produce adding, subtracting, and neutral on said totalizers.

54. In a combined typewriting and computing machine, the combination with a plurality of totalizers, of a controlling device for each of said totalizers, a single handle for controlling both of said totalizers, a single cam plate operated by said handle for operating said controlling devices, a follower for each controlling device adapted to be moved by said cam plate so that said cam plate, by mere movement thereof by said handle, will produce adding, subtracting, and neutral on said totalizers, a second cam plate also under the control of said handle, a shaft for said second cam plate, a device common to said totalizers under the control of said second cam plate, and a sleeve on said shaft connecting said handle and said first-named plate.

55. In a combined typewriting and computing machine, the combination with a typewriting mechanism including a carriage traveling from point to point to determine different computing zones or columns, of a plurality of computing units, each capable of computing in coöperation with any computing column or zone along the travel of the typewriter carriage, and in or out of cooperation with each other, and a single control common to all said computing units for governing the states thereof and set to have all possible computing permutations and combinations of states of the plurality of computing units, and also manipulable at will so as to selectively obtain any possible combination of states of the computing units for any computing column or zone as determined by the position of the typewriter carriage.

56. In a combined typewriting and computing machine, the combination with a typewriting mechanism including a carriage traveling from point to point to determine different computing zones or columns, of a plurality of computing units, each capable of computing in coöperation with any computing column or zone along the travel of the typewriter carriage, and in or out of coöperation with each other, a single control common to all said computing units for governing the states thereof, and set to have all possible computing permutations and combinations of states of the plurality of computing units, and also manipulable at will so as to selectively obtain any possible combination of states of the computing units for any computing column or zone as determined by the position of the typewriter carriage, and indicating means for designating at any particular time the combination of states determined by said control.

WALTER WRIGHT.

Witnesses:
LORENZ L. PRITZLE,
EDWARD THOMAS.

Copies of this patent may be obtained for five cents each, by addressing the "Commissioner of Patents, Washington, D. C."